US009538731B2

(12) United States Patent
Rust et al.

(10) Patent No.: US 9,538,731 B2
(45) Date of Patent: Jan. 10, 2017

(54) AVIARY CAGE WITH MANURE REMOVAL SYSTEM AND METHOD FOR CONSTRUCTING THE SAME

(71) Applicant: Rose Acre Farms, Inc., Seymour, IN (US)

(72) Inventors: Marcus D. Rust, Remington, IN (US); David S. Hurd, Rensselaer, IN (US)

(73) Assignee: Rose Acre Farms, Inc., Seymour, IN (US)

( * ) Notice: Subject to any disclaimer, the term of this patent is extended or adjusted under 35 U.S.C. 154(b) by 0 days.

(21) Appl. No.: 14/217,548

(22) Filed: Mar. 18, 2014

(65) Prior Publication Data

US 2015/0264894 A1 Sep. 24, 2015

(51) Int. Cl.
*A01K 31/16* (2006.01)
*A01K 31/22* (2006.01)
*A01K 31/04* (2006.01)
*A01K 31/14* (2006.01)

(52) U.S. Cl.
CPC ............ *A01K 31/22* (2013.01); *A01K 31/04* (2013.01); *A01K 31/14* (2013.01); *A01K 31/16* (2013.01); *A01K 31/165* (2013.01); *Y10T 29/49* (2015.01)

(58) Field of Classification Search
CPC ...... A01K 31/14; A01K 31/16; A01K 31/165; A01K 31/04; A01K 31/002; A01K 31/005; A01K 31/17
See application file for complete search history.

(56) References Cited

U.S. PATENT DOCUMENTS

| | | | |
|---|---|---|---|
| 1,674,193 A | 6/1928 | Coltrin | |
| 2,096,356 A | 10/1937 | Fox | |
| 2,257,734 A | 10/1941 | Cornell | |
| 2,565,521 A | 8/1951 | Ratermann | |
| 2,692,578 A | 10/1954 | Manning | |
| 2,695,006 A | 11/1954 | Tellefson | |
| 2,805,644 A * | 9/1957 | Lieberman | A01K 31/005 119/442 |

(Continued)

FOREIGN PATENT DOCUMENTS

| | | |
|---|---|---|
| CH | 662244 A5 | 9/1987 |
| DE | 20317631 U1 | 4/2004 |

(Continued)

OTHER PUBLICATIONS

Big Dutchman, NATURA60 & NATURA70 The modern aviaries for barn and free range egg production, Product Brochure, Mar. 2010.

(Continued)

*Primary Examiner* — Monica Williams
*Assistant Examiner* — Michael A Fabula
(74) *Attorney, Agent, or Firm* — Ice Miller LLP

(57) ABSTRACT

An aviary is provided including an aviary cage having a first side, a second side, and a nesting area. The nesting area is positioned between the first side and the second side. A belt extends beneath the nesting area. A grate having a first end and a second end is positioned over the belt. The first end of the grate extends to the first side of the aviary cage, and the second end of the grate extends to the second side of the aviary cage. A first egg conveyor is positioned adjacent the first end of the grate. A second egg conveyor is positioned adjacent the second end of the grate.

19 Claims, 5 Drawing Sheets

(56) References Cited

U.S. PATENT DOCUMENTS

| | | | | |
|---|---|---|---|---|
| 2,882,857 | A * | 4/1959 | Ernst | A01K 31/17 119/475 |
| 2,956,539 | A | 10/1960 | Boening | |
| 2,970,567 | A * | 2/1961 | Rubin | A01K 31/04 119/458 |
| 3,002,494 | A * | 10/1961 | Murray | A01K 31/165 119/337 |
| 3,046,940 | A * | 7/1962 | Kurtz | A01K 31/007 119/335 |
| 3,062,185 | A | 11/1962 | Kurtz | |
| 3,119,375 | A * | 1/1964 | Ernst | A01K 31/17 119/337 |
| 3,124,101 | A * | 3/1964 | Wierenga | A01K 31/17 119/438 |
| 3,124,102 | A * | 3/1964 | Kurtz et al. | A01K 31/16 119/337 |
| 3,134,358 | A * | 5/1964 | Byrnes | A01K 1/035 119/458 |
| 3,139,065 | A * | 6/1964 | Willauer, Jr. | A01K 31/16 119/337 |
| 3,164,129 | A | 1/1965 | Rigterink | |
| 3,208,430 | A * | 9/1965 | Ernst | A01K 31/17 119/456 |
| 3,242,904 | A * | 3/1966 | Rannou | A01K 31/007 119/337 |
| 3,274,973 | A | 9/1966 | Woods et al. | |
| 3,312,194 | A * | 4/1967 | Ernst | A01K 31/04 119/451 |
| 3,319,606 | A * | 5/1967 | Virgil | A01K 31/04 119/337 |
| 3,339,528 | A * | 9/1967 | Summerour | A01K 31/165 119/337 |
| 3,464,389 | A | 9/1969 | Seiderman | |
| 3,485,214 | A * | 12/1969 | Burkholder | A01K 31/165 119/337 |
| 3,552,359 | A * | 1/1971 | Graves | A01K 31/17 119/336 |
| 3,581,709 | A * | 6/1971 | Van Huis | A01K 31/17 119/531 |
| 3,791,348 | A | 2/1974 | Marnett | |
| 3,796,189 | A | 3/1974 | Blondeel | |
| 3,867,903 | A * | 2/1975 | Fleshman | A01K 31/17 119/336 |
| 3,892,201 | A | 7/1975 | Crawford | |
| 3,976,032 | A | 8/1976 | Ramser et al. | |
| 3,978,819 | A | 9/1976 | Lovitt | |
| 4,008,690 | A * | 2/1977 | Van Huis | A01K 45/005 119/455 |
| 4,011,837 | A | 3/1977 | Ksioszk | |
| 4,020,793 | A | 5/1977 | Morrison | |
| 4,023,531 | A | 5/1977 | Thompson | |
| 4,188,911 | A | 2/1980 | Rafaely | |
| 4,250,837 | A | 2/1981 | Cocklereece | |
| 4,315,481 | A * | 2/1982 | Coile | A01K 31/22 119/437 |
| 4,321,887 | A | 3/1982 | Martin et al. | |
| 4,379,439 | A | 4/1983 | Baur | |
| 4,416,219 | A | 11/1983 | Dill | |
| 4,430,960 | A | 2/1984 | Nagel et al. | |
| 4,437,433 | A * | 3/1984 | Nijhof | A01K 31/007 119/455 |
| 4,474,137 | A | 10/1984 | Walters | |
| 4,480,588 | A | 11/1984 | Holladay et al. | |
| 4,653,430 | A * | 3/1987 | Mass | A01K 31/005 119/337 |
| 4,766,849 | A * | 8/1988 | Kawabata | A01K 31/17 119/337 |
| 4,841,909 | A | 6/1989 | Siciliano | |
| 4,936,257 | A | 6/1990 | Kuhlmann | |
| 5,094,186 | A * | 3/1992 | Andersen | A01K 31/16 119/337 |
| 5,174,242 | A | 12/1992 | Takeuchi | |
| 5,279,254 | A | 1/1994 | Dowty | |
| 5,570,657 | A | 11/1996 | Kuhlmann | |
| 5,596,949 | A | 1/1997 | Fanguy | |
| 5,662,068 | A | 9/1997 | Childs | |
| 5,666,905 | A | 9/1997 | Mackin et al. | |
| 6,234,114 | B1 * | 5/2001 | Dyer | A01K 31/16 119/334 |
| 6,394,031 | B1 * | 5/2002 | Moller | A01K 31/16 119/335 |
| 6,412,439 | B1 | 7/2002 | Otto-Lubker et al. | |
| 6,968,807 | B2 | 11/2005 | Kuhlmann | |
| 7,350,364 | B2 | 4/2008 | Meerpohl | |
| 7,827,938 | B2 | 11/2010 | Kuehlmann | |
| 2004/0144326 | A1 | 7/2004 | Smith | |
| 2004/0144329 | A1 | 7/2004 | Kuhlmann | |
| 2008/0173250 | A1 * | 7/2008 | Dowty | A01K 31/16 119/347 |
| 2009/0084323 | A1 * | 4/2009 | Tsubai | A01K 31/17 119/336 |
| 2015/0122190 | A1 | 5/2015 | Rust et al. | |
| 2015/0122191 | A1 | 5/2015 | Rust et al. | |
| 2015/0122192 | A1 | 5/2015 | Rust et al. | |
| 2015/0122193 | A1 | 5/2015 | Rust et al. | |
| 2015/0122195 | A1 | 5/2015 | Rust et al. | |
| 2015/0126105 | A1 | 5/2015 | Rust et al. | |
| 2015/0230432 | A1 | 8/2015 | Rust et al. | |
| 2015/0230433 | A1 * | 8/2015 | Dart | A01K 31/22 119/468 |

FOREIGN PATENT DOCUMENTS

| | | | | |
|---|---|---|---|---|
| EP | 1477057 A1 | 11/2004 | | |
| JP | 8172965 | * | 7/1996 | A01K 31/04 |
| JP | 8172966 | * | 7/1996 | A01K 31/04 |

OTHER PUBLICATIONS

Agricultural Mfg. & Textiles, Inc., FingerBelt Laced with Fingers, Internet Article, May 15, 2006, Agricultural Mfg., & Textiles, Inc.
Big Dutchman, Egg Production Photos, Internet Article.
Big Dutchman, The modem aviary for layers in floor management, Internet Article, Sep. 12, 2012-Aug. 13, 2013.
Big Dutchman, NATURA70: Flexible, efficient and profitable, Internet Article, Sep. 12, 2012-Aug. 13, 2013.
Big Dutchman, Group laying nest for optimum egg quality, Internet Article, Sep. 12, 2012-Aug. 13, 2013.
Poultry times.net, CSES research examines worker health, Internet Newspaper Article, Oct. 4, 2013.
Potters Poultry International, Aviary, Product Brochure.
Vencomatic Group, Bolegg Terrace, Product Brochure.
"Het etagesysteem voor leghennen; Ontwikkeling en toetsing van een volieresysteem voor leghennen" (1980-1987), Dec. 1, 1987 (Dec. 1, 1987), XP055195185, Netherlands.
"Tiered Floor System for Laying Hens-development and testing of a henhouse system for laying hens" (1980-1987), Dec. 1, 1987 (Dec. 1, 1987) XP055195185, Netherlands, English translation.
(EP141911765.8) European Patent Office, European Search Report, Jul. 1, 2015.
(EP141911765.8) European Patent Office, Written Opinion of the European Search Report, Jul. 1, 2015.
"Ein 2-Etagen-Lautstall Für Leghennen" Karl-Ludwig Borchert, Braunschweig-Völkenrode (1985), XP002065271.
"A 2-tier coop for laying hens" Karl-Ludwig Borchert, Braunschweig-Völkenrode (1985), XP002065271, English Translation.
"Alternatieve huisvesting voor leghennen" Ing. A. Cappon, C. ter Beek, W.F. Frederiks, and ir. J.A.M. Voermans (Jun. 1986), XP55194182.
"Alternative housing for laying hens" Ing. A. Cappon, C. ter Beek, W.F. Frederiks, and ir. J.A.M. Voermans (Jun. 1986), XP55194182, English Translation.
"Massive Investment in Scottish Barn Egg Production" The Poultry Site (Feb. 20, 2014).

* cited by examiner

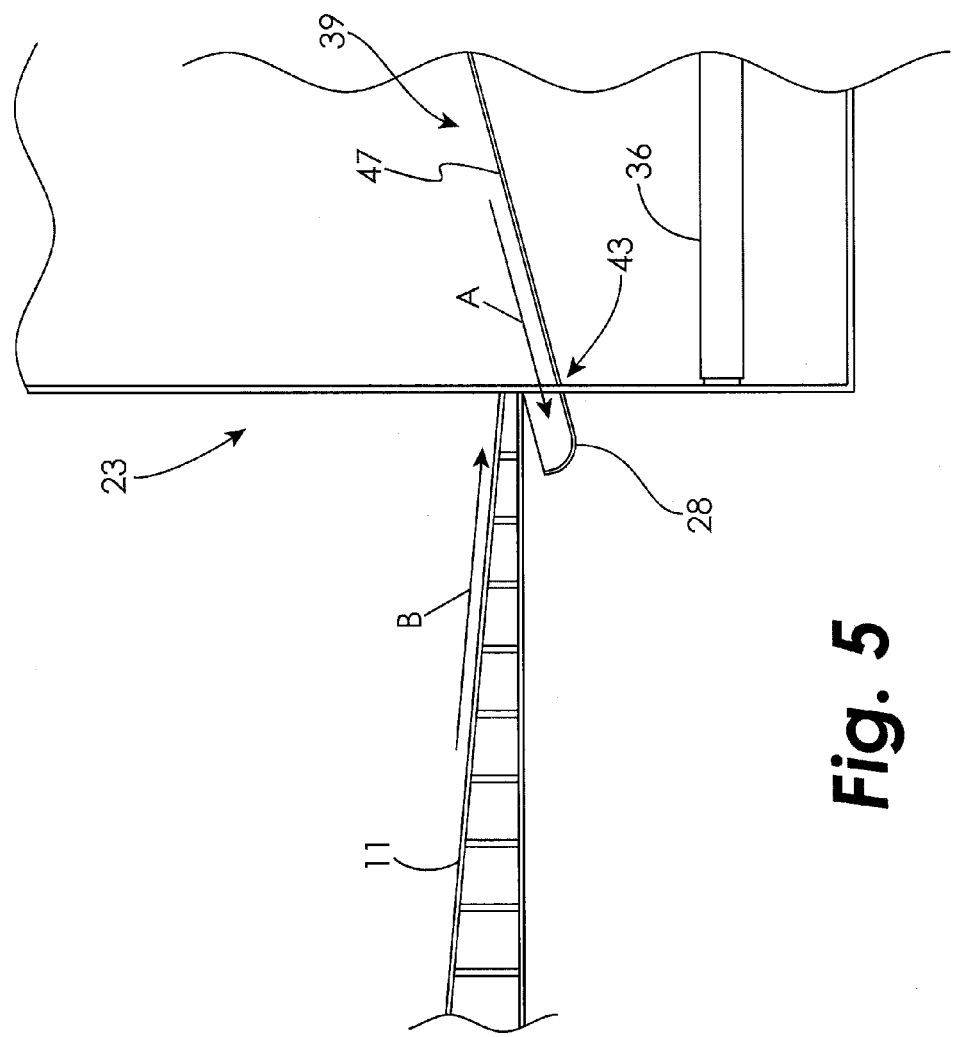

AVIARY CAGE WITH MANURE REMOVAL SYSTEM AND METHOD FOR CONSTRUCTING THE SAME

TECHNICAL FIELD OF THE DISCLOSED EMBODIMENTS

The embodiments herein generally relate to aviary cages and, more particularly, to aviary cages having egg and manure removal systems.

BACKGROUND OF THE DISCLOSED EMBODIMENTS

Aviary cages are frequently used to house hens for egg production. Generally, the aviary cage includes nesting areas where the eggs are laid. The eggs are then carried from the nesting area to a collection area by an egg conveyor that is positioned adjacent the nesting area. Recently, the need to provide the hens with an area to walk around and peck and scratch has increased dramatically as more farms are producing "cage free" product. "Cage free" indicates that the hens are not confined within cages.

Unfortunately, along with the benefits of being cage free, providing open spaces for the hens also means that the hens are able to defecate in more areas. Hens may also die in the open spaces. Accordingly, it has become difficult to keep some aviaries clean of manure and deceased fowl. This has resulted in increased harmful ammonia contamination within some aviaries. It has also increased the requirements for manual cage cleaning. Some cages utilize belts to carry manure from the cage to a collection area. However, the belts are only capable of receiving manure that is disposed of in the general area of the belt. Because cage free aviaries frequently include vast amounts of open space, not all of the manure within the aviary and the aviary cage can be collected by the belt.

Additionally, the increased open space leads to the likelihood of some eggs being laid outside of the nesting area. These eggs remain unattended until an individual is able to enter the aviary or cage and remove the eggs. As such, many eggs are lost. Moreover, the eggs that are salvaged from the open spaces of the cage may have become contaminated with bacteria due to the length of time they remained in contact with manure. Such eggs may not be sold for human consumption, which results in lower income for the producer.

SUMMARY OF THE DISCLOSED EMBODIMENTS

In one embodiment, an aviary is provided including an aviary cage having a first side, a second side, and a nesting area. The nesting area is positioned between the first side and the second side. A belt extends beneath the nesting area. A grate having a first end and a second end is positioned over the belt. The first end of the grate extends to the first side of the aviary cage, and the second end of the grate extends to the second side of the aviary cage. A first egg conveyor is positioned adjacent the first end of the grate. A second egg conveyor is positioned adjacent the second end of the grate.

In one embodiment, an aviary is provided including an aviary cage having a first side, a second side, and a nesting area. The nesting area is positioned between the first side and the second side. A belt extends beneath the nesting area. A grate having a first end and a second end is positioned over the belt. The first end of the grate extends to the first side of the aviary cage, and the second end of the grate extends to the second side of the aviary cage. A first egg conveyor is positioned adjacent the first end of the grate. A second egg conveyor is positioned adjacent the second end of the grate. A first portion of the grate is angled downward toward the first egg conveyor. A second portion of the grate is angled downward toward the second egg conveyor. A scratching floor extends from the aviary cage adjacent to the grate. The scratching floor is sloped toward the grate to facilitate movement of an egg on the scratching floor to the grate.

In one embodiment, a method of forming an aviary including an aviary cage having a first side, a second side, and a nesting area is provided. The method includes positioning the nesting area between the first side and the second side and extending a belt beneath the nesting area. The method further includes positioning a grate having a first end and a second end over the belt so that the first end of the grate extends to the first side of the aviary cage, and the second end of the grate extends to the second side of the aviary cage. The method further includes positioning a first egg conveyor adjacent the first end of the grate and positioning a second egg conveyor adjacent the second end of the grate.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein:

FIG. 5 is an expanded view of a scratching floor, a grate, a side of an aviary cage, and a belt formed in accordance with an embodiment.

DETAILED DESCRIPTION OF THE DISCLOSED EMBODIMENTS

Figure 1:
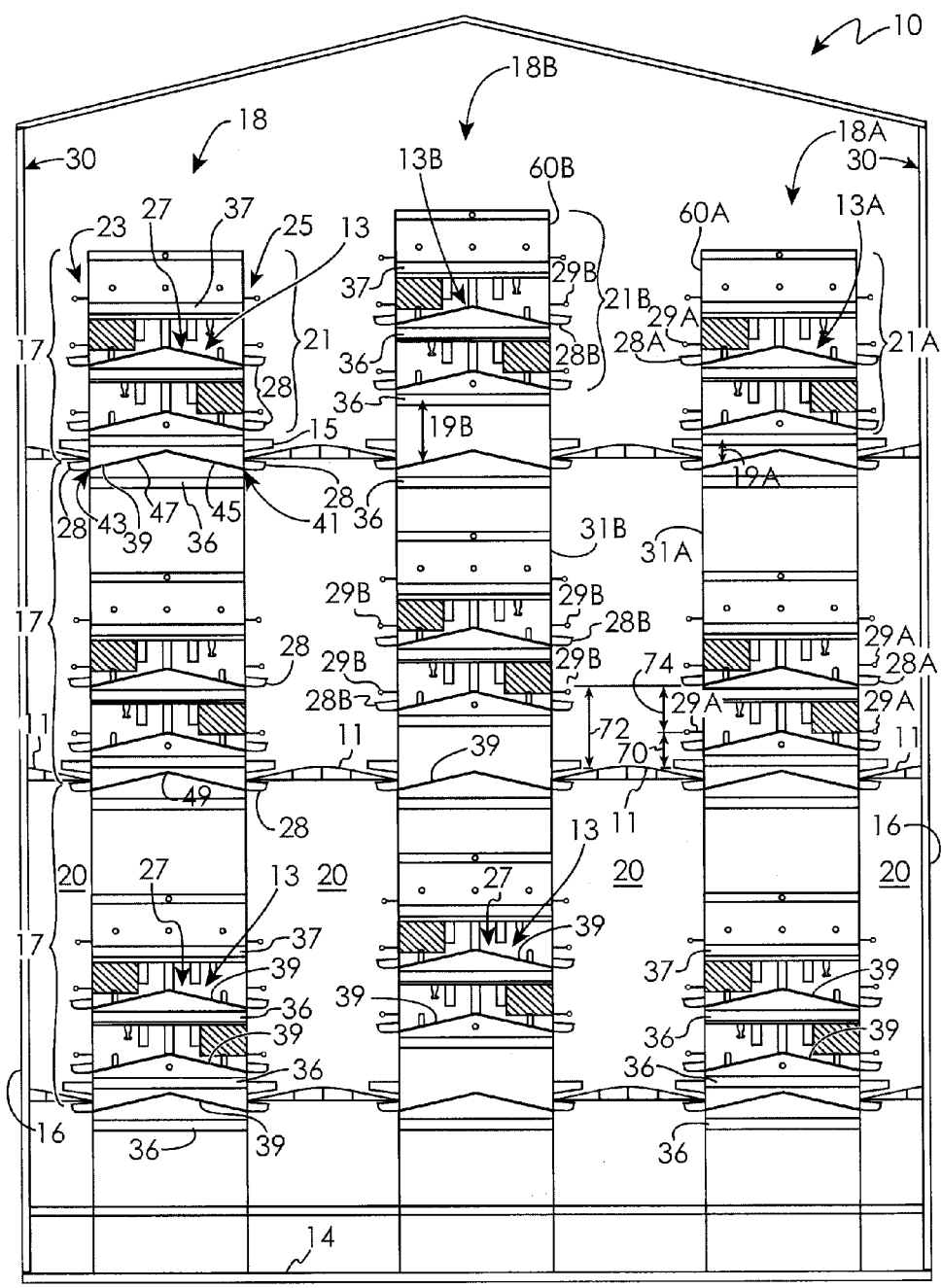
FIG. 1 is a front view of an aviary formed in accordance with an embodiment.

The features and advantages of this disclosure, and the manner of attaining them, will be more apparent and better understood by reference to the following descriptions of the disclosed methods and systems, taken in conjunction with the accompanying drawings. The components in the figures are not necessarily to scale, emphasis instead being placed upon illustrating the principles of the disclosure. Moreover, in the figures like-referenced numerals designate corresponding parts throughout the different views, but not all reference numerals are shown in each of the figures.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2:
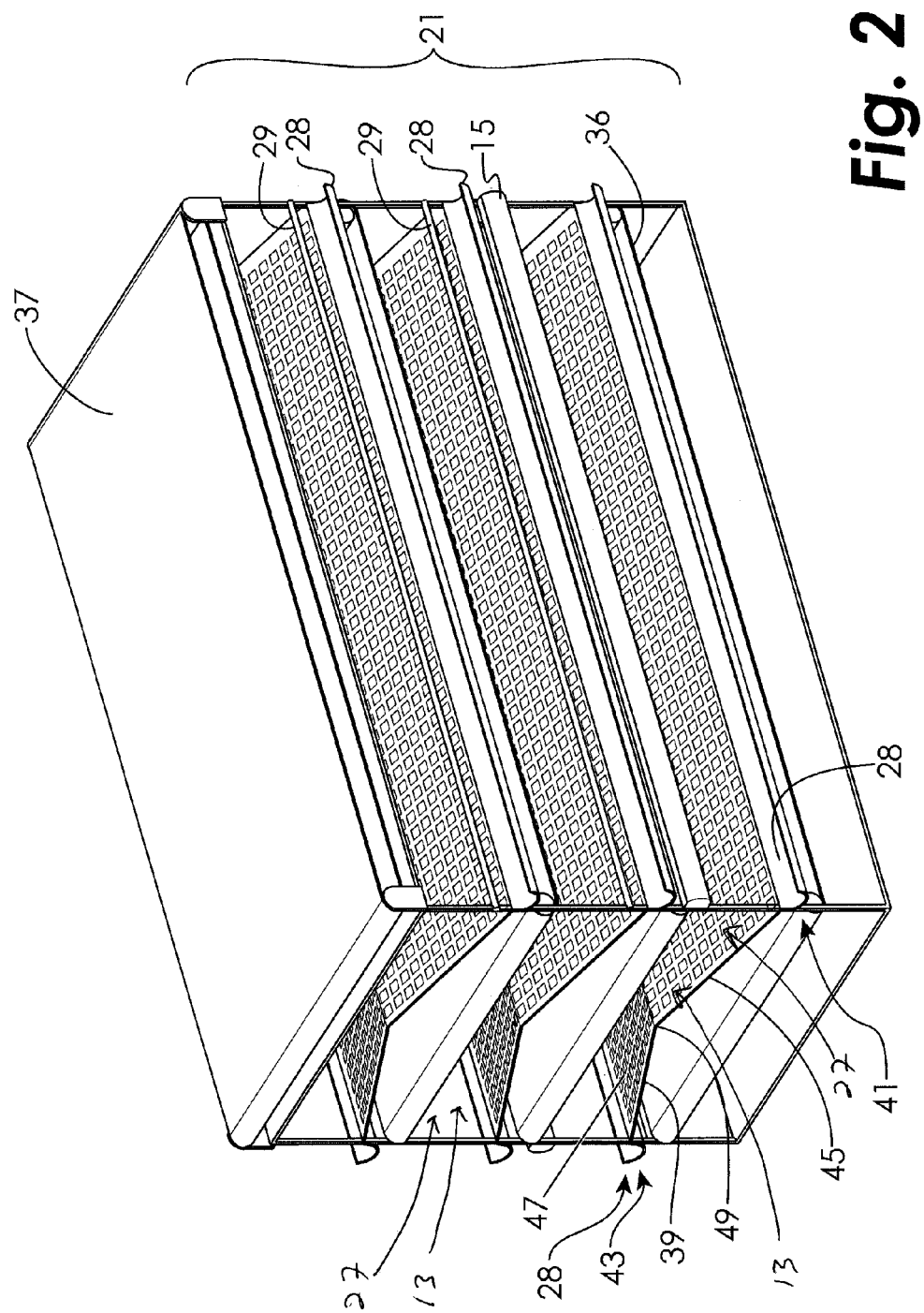
FIG. 2 is a side perspective view of an aviary cage shown in FIG. 1.
Figure 3:
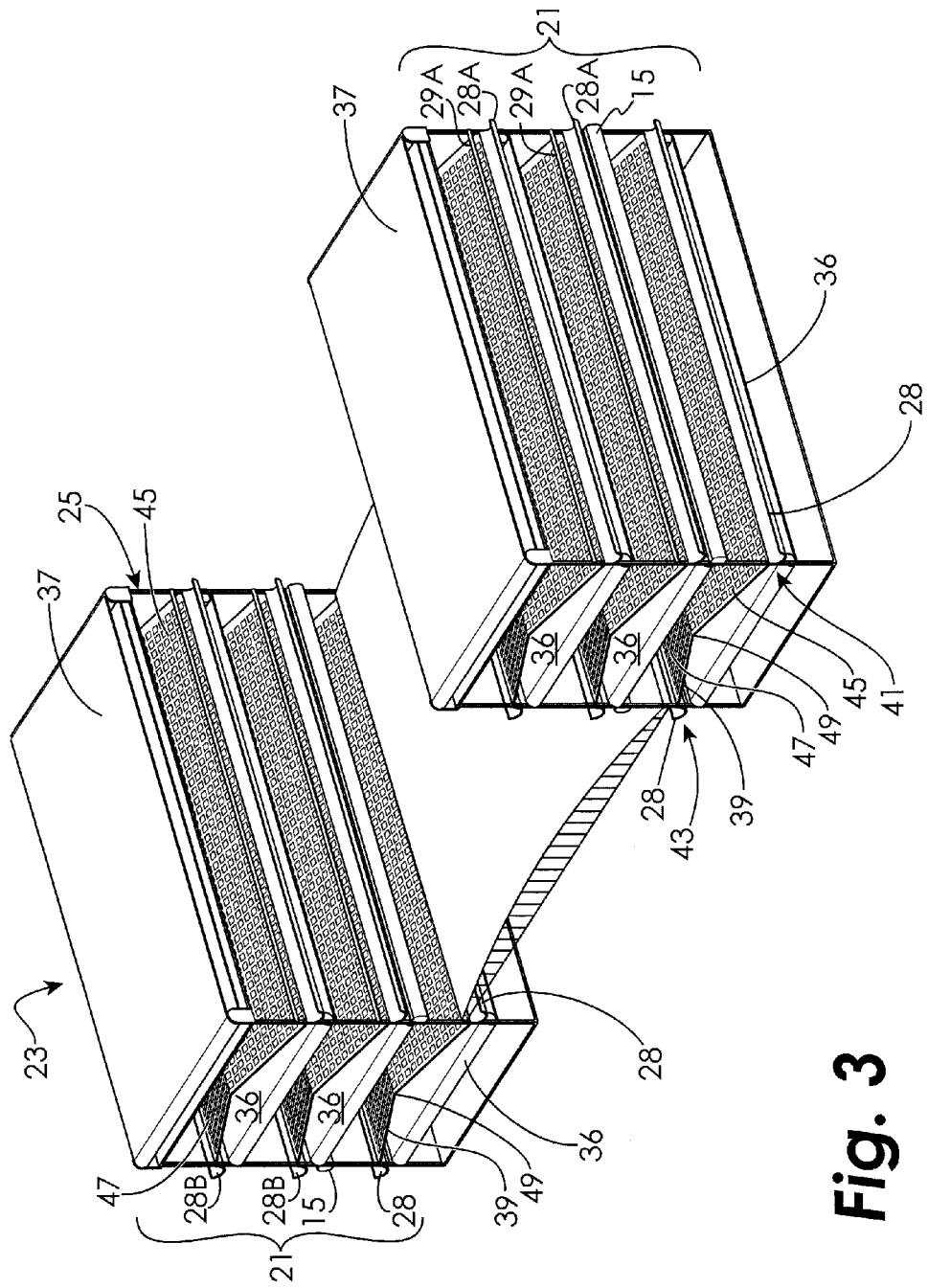
FIG. 3 is a side perspective view of a first aviary cage, a second aviary cage, and a scratching floor shown in FIG. 1.

FIGS. 1-3 illustrate an aviary 10 having a floor 14 enclosed by exterior walls 16. The exterior walls 16 define an interior surface 30. The exterior walls 16 enclose cage towers 18 where hens may be caged. Although the present embodiment illustrates three cage towers 18, it should be noted that the aviary 10 may be constructed with any number of cage towers 18, including a single cage tower 18. An aisle 20 extends between each cage tower 18 to provide an inspection area and space in which the birds housed in the aviary 10 may move. In an embodiment having a single cage tower 18, an aisle 20 is present on at least one side of the cage tower 18. An aisle 20 is likewise positioned between an end tower 18 and the respective exterior wall 16. At least one scratching floor 11 extends between each at least one cage tower 18. A scratching floor 11 likewise extends between the interior surface 30 of each exterior wall 16 and the adjacent cage tower 18.

Each at least one cage tower 18 includes at least one aviary cage 21. Each at least one aviary cage 21 includes a first side 25 and a second side 23 enclosing an inside area 13. At least one bump rail 15 extends from each of the first side 25 and the second side 23 and into the respective aisle 20 to allow equipment to be maneuvered through the aisle 20 without damaging the at least one cage tower 18 or the at least one aviary cage 21. The bump rail 15 may be used by the birds as a perch.

Each aviary cage 21 includes at least one nesting area 27. The nesting area 27 provides space where a hen may sit to lay eggs. As the hens lay their eggs, the eggs are collected in egg conveyors 28 that extend along the sides 25 and 23 of the aviary cage 21. The egg conveyors 28 carry the eggs from the nesting area 27 to a collection area.

At least one belt 36 extends through the tower 18 to remove a deposit from at least part of the tower 18. In an embodiment, a plurality of belts 36 extend through the tower 18 to remove deposits from at least part of the tower 18. The plurality of belts 36 are positioned at various vertical locations within each aviary cage 21. At least one belt 36 of the plurality of belts 36 is positioned below the nesting area 27 of each aviary cage 21. Additional belts 36 of the plurality of belts 36 extend through the nesting area 27 of each aviary cage 21. A deposit may include, but is not limited to, one or more items such as manure, litter, feathers, or feed. In one embodiment, at least one belt 36 extends through the tower 18 along the length of the tower 18. In one embodiment, the belt 36 extends approximately 400 feet along the length of the tower 18. In one embodiment, the belt 36 carries manure from the tower 18 to a collection area (not shown) positioned outside of the tower 18.

By removing deposits, particularly manure, from at least part of the tower 18, ammonia levels within the cage 10 are significantly reduced. Additionally, the need for an individual to enter the cage 10 and clean the cage 10 by hand is greatly reduced. Accordingly, the present embodiments permit one person to care for 150,000 to 200,000 birds, compared with the 3-5 people per 150,000 to 200,000 birds required when known cages and aviaries are used. The present embodiments also eliminate the requirement for extreme body positions, including squatting for extended periods of time and crawling and laying on the floor while loading and unloading the cage and while gathering eggs from the cage. The present embodiments further reduce potential respiratory hazards and infection hazards to the workers. In one embodiment, a belt 37 is positioned on top of the nesting area 27 and forms a floor of the tower 18. Accordingly, the birds are allowed to move freely and walk on the belt 37.

Figure 4:
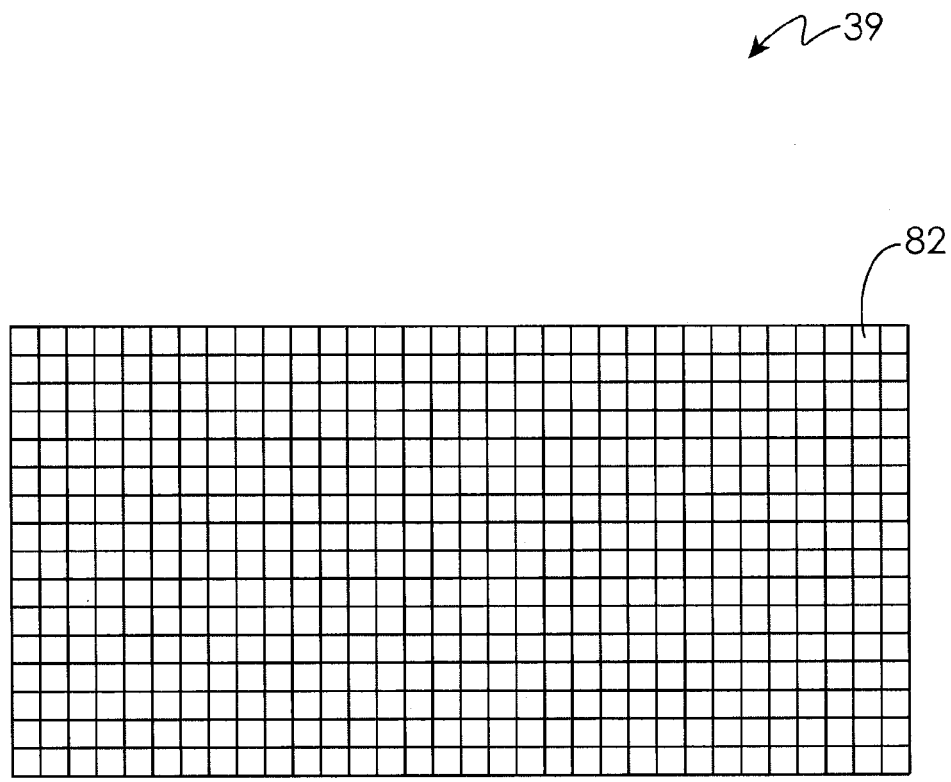
FIG. 4 is a top view of a mesh floor.

In one embodiment, a grate 39 is positioned over the belt 36. A portion of the grate 39 is illustrated in FIG. 4. As illustrated in FIG. 4 the grate 39 includes openings 82 therethrough that allow deposits, but not eggs, to pass through the grate 39 to the belt 36. The grate 39 has a first end 41 and a second end 43. The first end 41 extends to the first side 25 of the aviary cage 21. The second end 43 extends to the second side 23 of the aviary cage 21. In an embodiment (not shown), the grate 39 is flat. In an embodiment, the grate 39 is shaped so that it is sloped toward each end 41 and 43. Each end 41, 43 of the grate 39 is positioned adjacent an egg conveyor 28. The egg conveyors 28 are adapted to carry eggs from the aviary cage 21 to a collection area (not shown). In one embodiment, a grate 39 is positioned over each belt 36.

In an embodiment, a first portion 45 of the grate 39 is angled downward toward an egg conveyor 28 positioned adjacent the first end 41 of the grate 39. Likewise in this embodiment, a second portion 47 of the grate 39 is angled downward toward an egg conveyor 28 positioned adjacent the second end 43 of the grate 39. In one embodiment, the first portion 45 and second portion 47 of the grate 39 each extend from a centerline 49 of the grate 39. In one embodiment, the first portion 45 and the second portion 47 are angled from the centerline 49 at approximately a 7° to 8° grade. Eggs laid on the second portion 47 of grate 39 roll in the direction of arrow A (shown in FIG. 5) to the respective egg conveyor 28, which egg conveyor carries the eggs to the collection area. Eggs laid on the first portion 45 of the grate 39 roll to the respective egg conveyor 28 adjacent the first end 41 of the grate 39. In an embodiment in which the grate 39 is flat, the hens scratch the eggs to an egg conveyor 28.

In the illustrated embodiment, a scratching floor 11 extends between adjacent towers 18. Additionally, a scratching floor 11 extends between the end towers 18 and the respective exterior wall 16. In some embodiments, the scratching floor is solid. The scratching floor 11 is oriented with respect to at least one belt 36. In one embodiment, the scratching floor 11 is oriented with respect to a belt 36 that extends below the nesting area 27 of an aviary cage 21. In one embodiment, the scratching floor 11 is sloped to allow deposits to move back toward the belt 36. In one embodiment, the scratching floor 11 is crowned so that each side of the scratching floor 11 slopes toward a belt 36. In particular, the scratching floor 11 is sloped toward the grate 39. In one embodiment (not shown), the scratching floor 11 is flat. The ends 41 and 43 of the grate 39 are positioned below the scratching floor 11, so that the egg conveyors 28 extend below the scratching floor 11.

The scratching floor 11 provides a pecking area for the hens to utilize while they are not nesting. In particular, the scratching floor 11 provides a scratching area for the birds within the aviary 10. When the birds scratch the scratching floor 11, they scratch much of the deposits made on the scratching floor 11 onto the respective belt 36. Accordingly, since it is common for birds to defecate in their scratching area, the scratching floor 11 becomes relatively self-cleaning as the hens scratch.

Particularly, by way of example, deposits may be scratched from the scratching floor 11 in the direction of arrow B (shown in FIG. 5) toward the grate 39. Deposits may be scratched toward a grate 39 from either direction on the scratching floor 11. These deposits then pass through the openings 82 in the grate 39 and onto the belt 36, where they are removed from the aviary 10. Such configuration greatly reduces the amount of ammonia captured within the aviary 10 and also reduces the required frequency for cleaning of the aviary 10.

Any eggs laid on the scratching floor 11 are directed toward an egg conveyor 28 by the scratching of the hens. In particular, eggs laid on the scratching floor 11 illustrated in FIG. 5 likewise roll in the direction of arrow B toward the grate 39. Eggs may be scratched toward a grate 39 from either direction on the scratching floor 11. Upon reaching the grate 39, the eggs roll toward the respective egg conveyor 28, such as, for example, in the direction of arrow A along the grate 39, under the scratching floor 11, and into the egg conveyor 28. In an embodiment (not shown), eggs laid on a flat scratching floor 11 are rolled by the scratching of the hens toward the grate 39 and, upon reaching the grate 39, are scratched by the hens into the egg conveyor 28.

In an embodiment, a first cage tower 18A includes a first aviary cage 21A, and a second cage tower 18B includes a second aviary cage 21B, which second aviary cage 21B is substantially similar to the first aviary cage 21A. Multiple first aviary cages 21A are stacked on top of one another. Each first aviary cage 21A includes a first outside surface 60A enclosing an inside area 13A. Additionally, multiple second aviary cages 21B are stacked on top of one another. Each second aviary cage 21B includes a second outside surface 60B enclosing an inside area 13B. The second aviary cage 21B is positioned adjacent the first aviary cage 21A and an aisle 20 is formed therebetween. The second aviary cage 21B is positioned at a height 19B from the grate 39. The first aviary cage 21A is positioned at a height 19A from the grate 39. Height 19B is greater than height 19A.

Referring to an embodiment, a first perch 29A extends from the first outside surface 60A of the first aviary cage 21A and is positioned above a first egg conveyor 28A that extends from the first outside surface 60A and that extends along the sides of the first aviary cage 21A. When the hens lay their eggs, the eggs may be collected in the first egg conveyor 28A. The first egg conveyor 28A carries the eggs from the aviary cage 21A to a collection area. The first perch 29A extends into the aisle 20 at a first vertical distance 70 from the scratching floor 11. A second perch 29B extends from the second outside surface 60B of the second aviary cage 21B and is positioned above a second egg conveyor 28B that extends from the second outside surface 60B and that extends along the sides of the second aviary cage 21B. The second egg conveyor 28B carries the eggs from the aviary cage 21B to a collection area. The second perch 29B extends into the aisle 20 at a second vertical distance 72 from the scratching floor 11. The first vertical distance 70 is not equal to the second vertical distance 72. In an embodiment, the first vertical distance 70 and the second vertical distance 72 define a third vertical distance 74. The third vertical distance 74 is configured to permit a bird to hop from the first perch 29A to the second perch 29B or vice versa.

In some embodiments, the perches 29 are solid. In one embodiment, the perches 29 may be square. In one embodiment, the perches 29 may be round. In one embodiment, a square perch 29 may have a width of ¾ inches to 2 inches. In one embodiment, a round perch 29 may have a diameter of ¾ inches to 2 inches. The width or diameter of the perch 29 is configured to allow a hen to stand on the perch 29. In an embodiment, each of the perches 29 may extend a portion of the length of the respective cage tower 18. In an embodiment, each of the perches 29 may extend the entire length of the respective cage tower 18.

In one embodiment, an angle formed between the first perch 29A and the second perch 29B is no greater than 45°, which configuration facilitates the behavior of birds to hop from one surface to another. In one embodiment, a plurality of first and second perches 29A, 29B are spaced apart about the outside surfaces 31A and 31B of the respective cage towers 18A and 18B. In an embodiment, each perch 29A and 29B extends into the aisle 20 to provide usable vertical space that creates additional habitable cubic inches for the birds, thereby enabling the aviary 10 to be considered cage free.

In an embodiment, the first aviary cage 21A may include multiple first perches 29A, corresponding to the number of first egg conveyors 28A, and the second aviary cage 21B may include multiple second perches 29B, corresponding to the number of second egg conveyors 28B, wherein the first perches 29A and the second perches 29B are staggered in relation to each other along the first and second outside surfaces 31A, 31B of the cage towers 18A and 18B. In one embodiment, the first perches 29A and the second perches 29B are staggered vertically on the first and second outside surfaces 31A, 31B of the cage towers 18A and 18B. In one embodiment, the first perches 29A and the second perches 29B are staggered horizontally along the first and second outside surfaces 31A, 31B of the cage towers 18A and 18B.

By permitting space for the hens to move freely, the aviary 10 satisfies the requirements for the birds and their eggs to be considered cage free. See http://en.wikipedia.org/wiki/Cage-free. The hens are not continuously confined to an aviary cage. The present embodiments allow the production of eggs that may be sold under the label "cage free" because they were laid outside of a conventional cage environment. In the illustrated embodiments, the scratching floors 11 form three levels 17 in the aviary 10, wherein each level 17 may be accessed by a worker.

A hen may walk, peck, scratch, socialize, sleep, and lay eggs, as the bird desires in the inside area 13. These same daily activities can be carried out on the at least one scratching floor 11. The at least one aviary cage 21 may house a specific group of birds or it may be open to birds from other aviary cages 21. In an embodiment, the cage tower 18 may be configured to allow the birds to move freely up and down the cage tower 18. In an embodiment, the cage tower 18 may be configured to keep birds in the aviary segregated by vertical level. When the hens lay their eggs, the eggs may be collected in egg conveyors 28 that extend along the sides of the aviary cage 21. The egg conveyors 28 carry the eggs from the aviary cage 21 to a collection area.

Each perch 29 and each bump rail 15 provide yet other areas for the hens to utilize when they are not confined to the at least one aviary cage 21. In particular, hens may sit, hop, walk, scratch, socialize, sleep, and lay eggs from or on any perch 29 and/or any bump rail 15.

When a first perch 29A and a second perch 29B are included in an embodiment, the first vertical distance 70 and the second vertical distance 72 define a third vertical distance 74, which third vertical distance 74 is configured to facilitate the behavior of birds to hop from one surface to another and thereby create a ladder effect between the outside surfaces 60A, 60B of the aviary cages 21A and 21B and, concomitantly, outside surfaces 31A and 31B of the cage towers 18A and 18B.

In one embodiment, a method of forming an aviary 10 including an aviary cage 21 having a first side 25, a second side 23, and a nesting area 22 is provided. The method includes positioning the nesting area 22 between the first side 25 and the second side 23 and extending a belt 36 through the nesting area 22. A grate 39 is positioned over the belt 36 so that a first end 41 of the grate 39 extends to the first side 25 of the aviary cage 21, and a second end 43 of the grate 39 extends to a second side 23 of the aviary cage 21. A first egg conveyor 28 is positioned at the first end 41 of the grate 39, and a second egg conveyor 28 is positioned at the second end 43 of the grate 39.

In one embodiment, the grate 39 is flat. In one embodiment, a first portion 45 of the grate 39 is angled downward toward the first egg conveyor 28, and a second portion 47 of the grate 39 is angled downward toward the second egg conveyor 28. In one embodiment, the belt 36 is positioned to capture and transport debris that falls through the grate. In one embodiment, a scratching floor 11 is extended from the aviary cage 21 adjacent to the grate 39. In one embodiment, the scratching floor 11 is sloped toward the grate 39 to facilitate movement of an egg on the scratching floor 11 to the grate 39. In one embodiment, the scratching floor 11 is a solid floor. In one embodiment, a belt 37 is extended above the aviary cage 21. The belt 37 is positioned to capture and transport deposits that fall onto it, which deposits may include, but are not limited to, manure, litter, feed, eggs, and deceased birds.

In one embodiment, the aviary cage 21 is a first aviary cage 21A and a second aviary cage 21B is positioned adjacent the first aviary cage 21A. In such an embodiment, the method includes extending an aisle 20 between the first aviary cage 21A and the second aviary cage 21B. A first perch 29A is extended from the first aviary cage 21A and into the aisle 20 at a first vertical distance 70 from a scratching floor 11. A second perch 29B is extended from the second aviary cage 21B and into the aisle 20 at a second vertical distance 72 from the scratching floor 11. The first and second vertical distances 70, 72 from the scratching floor 11 are not equal.

In one embodiment, the aviary 10 includes a plurality of first perches 29A and a plurality of second perches 29B. The method in this embodiment includes horizontally offsetting the plurality of first perches 29A from one another and horizontally offsetting the plurality of second perches 29B from one another. In one embodiment, the aviary 10 includes a plurality of first perches 29A and a plurality of second perches 29B, and the method includes vertically offsetting the plurality of first perches 29A from one another and vertically offsetting the plurality of second perches 29B from one another. In one embodiment, the first vertical distance 70 and the second vertical distance 72 define a third vertical distance 74. The third vertical distance 74 enables an animal to hop between the first perch 29A and the second perch 29B.

The systems and methods according to the present disclosure can be further modified within the scope and spirit of this disclosure. This application is therefore intended to cover any variations, uses, or adaptations of the disclosure using its general principles. For example, the methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains and which fall within the limits of the appended claims.

What is claimed is:

1. A cage-free aviary comprising:
a cage-free aviary module having a first side, a second side, and a nesting area, said nesting area positioned between the first side and the second side;
a belt extending beneath the nesting area;
a grate having a first end and a second end, said grate being positioned within the nesting area and over the belt, the first end of the grate extending to the first side of the cage-free aviary module and the second end of the grate extending to the second side of the cage-free aviary module;
a first egg conveyor positioned adjacent the first end of the grate;
a second egg conveyor positioned adjacent the second end of the grate; and
a scratching platform extending from the cage-free aviary module adjacent to the grate;
wherein the scratching platform is sloped toward the grate to facilitate movement of a deposit on the scratching platform to the grate.

2. The cage-free aviary of claim 1, wherein a first portion of the grate is angled downward toward the first egg conveyor, and a second portion of the grate is angled downward toward the second egg conveyor.

3. The cage-free aviary of claim 1, wherein the belt captures and transports debris that falls through the grate.

4. The cage-free aviary of claim 1, wherein the scratching platform comprises a solid floor.

5. The cage-free aviary of claim 1 further comprising a belt extending above the cage-free aviary module.

6. The cage-free aviary of claim 1, wherein the cage-free aviary module is a first free aviary module, the cage-free aviary further comprising:
a second cage-free aviary module positioned adjacent the first cage-free aviary module;
an aisle extending between the first cage-free aviary module and the second cage-free aviary module;
a first perch extending from the first cage-free aviary module and into the aisle at a first vertical distance from a floor; and
a second perch extending from the second cage-free aviary module and into the aisle at a second vertical distance from the floor, wherein the first and second vertical distances from the floor are not equal.

7. The cage-free aviary of claim 6 further comprising a plurality of first perches and a plurality of second perches, the plurality of first perches being horizontally offset from one another, the plurality of second perches being horizontally offset from one another.

8. The cage-free aviary of claim 6 further comprising a plurality of first perches and a plurality of second perches, the plurality of first perches being vertically offset from one another, the plurality of second perches being vertically offset from one another.

9. A cage-free aviary comprising:
a cage-free aviary module having a first side, a second side, and a nesting area, said nesting area positioned between the first side and the second side;
a belt extending beneath the nesting area;
a grate having a first end and a second end, said grate being positioned within the nesting area and over the belt, the first end of the grate extending to the first side of the cage-free aviary module and the second end of the grate extending to the second side of the cage-free aviary module;
a first egg conveyor positioned adjacent the first end of the grate;
a second egg conveyor positioned adjacent the second end of the grate;

wherein a first portion of the grate is angled downward toward the first egg conveyor, and a second portion of the grate is angled downward toward the second egg conveyor; and a scratching platform extending from the cage-free aviary module adjacent to the grate, the scratching platform being sloped toward the grate to facilitate movement of an egg on the scratching platform to the grate.

10. The cage-free aviary of claim 9, wherein the cage-free aviary module is a first cage-free aviary module, the cage-free aviary further comprising:

a second cage-free aviary module positioned adjacent the first cage-free aviary module;

an aisle extending between the first cage-free aviary module and the second cage-free aviary module;

a first perch extending from the first cage-free aviary module and into the aisle at a first vertical distance from a floor; and a second perch extending from the second cage-free aviary module and into the aisle at a second vertical distance from the floor, wherein the first and second vertical distances from the floor are not equal.

11. A method of forming a cage-free aviary including a cage-free aviary module having a first side and a second side, the method comprising:

positioning a nesting area between the first side and the second side;

extending a belt below the nesting area;

positioning a grate having a first end and a second end within the nesting area and over the belt;

positioning the grate such that the first end of the grate extends to the first side of the cage-free aviary module and such that the second end of the grate extends to the second side of the cage-free aviary module;

positioning a first egg conveyor adjacent the first end of the grate;

positioning a second egg conveyor adjacent the second end of the grate;

extending a scratching platform from the cage-free aviary module adjacent to the grate; and sloping the scratching platform toward the grate to facilitate movement of a deposit on the scratching platform to the grate.

12. The method of claim 11 further comprising:

angling a first portion of the grate downward toward the first egg conveyor; and angling a second portion of the grate downward toward the second egg conveyor.

13. The method of claim 11 further comprising positioning the belt to capture and transport debris that falls through the grate.

14. The method of claim 11 further comprising positioning a scratching platform that comprises a solid floor.

15. The method of claim 11 further comprising extending a belt above the cage-free aviary module.

16. The method of claim 11, wherein the cage-free aviary module is a first cage-free aviary module and a second cage-free aviary module is positioned adjacent the first cage-free aviary module, the method further comprising:

extending an aisle between the first cage-free aviary module and the second cage-free aviary module;

extending a first perch from the first cage-free aviary module and into the aisle at a first vertical distance from a floor; and extending a second perch from the second cage-free aviary module and into the aisle at a second vertical distance from the floor, wherein the first and second vertical distances from the floor are not equal.

17. The method of claim 16, wherein the cage-free aviary includes a plurality of first perches and a plurality of second perches, the method further comprising:

horizontally offsetting the plurality of first perches from one another; and horizontally offsetting the plurality of second perches from one another.

18. The method of claim 16, wherein the cage-free aviary includes a plurality of first perches and a plurality of second perches, the method further comprising:

vertically offsetting the plurality of first perches from one another; and vertically offsetting the plurality of second perches from one another.

19. A cage-free aviary comprising:

an aviary floor;

a cage-free aviary module positioned on the aviary floor and having a first side, a second side, and a nesting area, said nesting area positioned between the first side and the second side;

a belt extending beneath the nesting area;

a grate having a first end and a second end, said grate being positioned within the nesting area and over the belt, the first end of the grate extending to the first side of the cage-free aviary module and the second end of the grate extending to the second side of the cage-free aviary module;

a first egg conveyor positioned adjacent the first end of the grate;

a second egg conveyor positioned adjacent the second end of the grate; and a scratching platform vertically spaced apart from the aviary floor and extending from the cage-free aviary module adjacent to the grate.

* * * * *